United States Patent Office

3,262,880
Patented July 26, 1966

3,262,880
PROCESSING CARBONATE DISPERSIONS IN OILS
Vanderveer Voorhees, Los Altos, Calif., assignor to Bray Oil Company, Los Angeles, Calif., a limited partnership of California
No drawing. Filed Sept. 23, 1963, Ser. No. 310,845
7 Claims. (Cl. 252—33)

This application is a continuation-in-part of my applications Serial No. 853,631, filed November 17, 1959, now Patent No. 3,170,880, Serial No. 46,459, filed August 1, 1960, now Patent No. 3,105,049, and Serial No. 146,324, filed October 19, 1961, now Patent No. 3,155,616.

This invention relates to the processing of dispersions of carbonates of the metals of Group II of the Periodic Table of Elements and particularly to the metals, magnesium, calcium and barium.

In the manufacture of lubricating oils commonly known as "superbased" I have discovered that anhydrous methanol forms complexes with Group II metals which can be dispersed in lubricating oils with the aid of oil-soluble dispersion agents, particularly oil-soluble sulfonates such as mahogany sulfonate, alkyl benzene sulfonates, dinonyl naphthalene sulfonate and the like. These sulfonates commonly have upwards of 20 carbon atoms and are preferentially oil-soluble.

In the manufacture of the complex with anhydrous methanol, it is important that the methanol contain not more than ½% water. When employing calcium and barium, I prefer to use the oxide of the metal whereas when magnesium is employed I use magnesium metal which reacts directly with anhydrous methanol to form the complex which then is mixed with the oil and sulfonate.

In order to complete the formation of the complex, it is necessary to introduce carbon dioxide. The carbon dioxide can be introduced simultaneously with the oil and sulfonate but I prefer to introduce the carbon dioxide partly, e.g., 20 to 50% of that theoretically required, or entirely into the mixture of methanol and Group II metal oxide within a period of about 1 to 10 minutes, thereby avoiding gellation, then rapidly mixing with sulfonate. I have discovered that, if the complex of metal oxide, $CO_2$ and methanol is introduced into a hydrocarbon solution of the sulfonate or other dispersing agent rather than the reverse, a more complete carbonation of the metal is accomplished with a higher degree of dispersion, leaving less material to be filtered from the product.

In the formation of carbonate dispersions by the use of anhydrous methanol, a serious problem is encountered by the formation of gels. These gels frequently cause a complete solidification of the oil into a solid or semi-solid structure which are substantially impossible to handle. I have previously discovered that these gels can be disintegrated or dissolved by the action of water. The chemistry of the formation of these gels and their disintegration by water is obscure. However, I have established that a portion of the methanol employed in the process forms a stable chemical combination with the metal and sulfonate so that part of the methanol cannot be removed from the oil and disperse carbonate even when heated to a temperature more than 100° above the boiling point of methanol.

In the treatment of these gels with water, the chemically combined methanol is released. I have now discovered that this combined methanol can be released by the action of steam contacting the oil at 220 to 280° F. and that the methanol can be thereby evaporated without the necessity of liquid water being present. However, I have found that the gels cannot be completely disintegrated or dissolved unless the oil is subsequently treated with water in the form of liquid, i.e., at a temperature below the boiling point of water in the mixture. Accordingly, I now provide a method for processing lubricating oil—metal oxide—methanol—carbon dioxide complexes in two stages: (1) elemination of the major portion of methanol by treating with water in the vapor stage and subsequently completing the disintegration of the gells by treating with water in the liquid stage, thereby avoiding the deleterious effect of methanol on the product. Usually 25 to 60% of the water is added in the first or vapor stage.

In the manufacture of superbased sulfonates of the type herein above described, it has frequently been difficult to control the process to obtain products which are readily filterable. I have discovered that the two principal factors affecting filter rates are gel formation and particle size of dispersed metal carbonate. I have also discovered that when the products are treated with water and allowed to stand in contact with water and a small amount of methanol which has been liberated by the action of the water, degradation of the oil dispersion takes place as a result of particle growth. Accordingly, it has heretofore been quite difficult to control the water treatment in order that it be made sufficiently thorough to break up or disintegrate the gel structure and at the same time avoid particle growth. I have discovered that if the amount of water employed is controlled within .05 to 0.2 volume for each volume of oil and sulfonate employed, and if the time of water treating is kept within the range of about 5 minutes to 40 minutes before all the released methanol is distilled off, then the product will be completely free of gel and will have a satisfactory particle size so that it will be readily filterable and produce a clear oil without objectionable cloud caused by excessively large particles in the range of 0.1 micron to 1 micron or larger. In preparing the complex, I prefer to use about 75 to 90% of theoretical amount of carbon dioxide required to convert the metal to carbonate. The unreacted metal oxide subsequently is converted to hydroxide during the water treatment which gives rise to what is known as "hydroxyl" alkali value. This is conveniently determined by titration with phenolphthalein indicator or electrometrically.

My improved process of treating is illustrated by the following examples:

*Example 1*

A stock solution of a calcium dispersion in oil was prepared as follows: To 2907 gallons of anhydrous methanol containing 20 percent by volume of xylene solvent was added 2820 lbs. of calcium oxide pulverized to pass 300 mesh. Into this mixture, while rapidly agitating, was passed carbon dioxide and when the temperature had risen from 100° F. to 120° F., there was added 2519 gallons of a 50% mixture of xylene solvent and lubricating oil-calcium mahogany sulfonate solution. The sulfonate-oil solution contained about 40% sulfonate by weight, had an ash value of about 8% (sulfated) and an alkali value of about 15 mg. KOH per gram. It is often convenient to employ as much as 2 volumes of solvent for each volume of sulfonate-oil solution used.

The xylene-oil-sulfonate solution was introduced into the methanol-lime dispersion in the shortest possible time consistent with apparatus limitations. Not more than ten minutes should be required for combining the two reagents, usually one to five minutes. I have found it advantageous to add the lime-methanol slurry to the sulfonate solution in which case, time of mixing is of no importance.

Carbonation of the mixture was continued until substantially no more was absorbed. A total of 1800 lbs. of $CO_2$ had been absorbed, corresponding to about 80–85% of the amount theoretically required to convert the calcium oxide to carbonate. An additional dilution with 3112 gallons of xylene solvent was added to maintain the mixture freeflowing. All xylene used as well as the sulfonate and oil must be water free. The sulfonate-oil mixture is conveniently dried by heating to 300° F., while the xylene solvent can be dried by carefully settling, then passed thru a drying tower in contact with solid calcium chloride, silica gel or other drying agent. Petroleum fractions boiling in the range of 250–350° F. are also satisfactory diluents.

During carbonation, which usually requires from one-half to two hours, the temperature rises to about 135–145° F. Cooling is usually desirable to avoid loss of methanol from the reaction by distillation.

The mixture is then heated, preferably in a separate still, to recover methanol by distillation. Substantially all the free, uncombined methanol is distilled when the oil solution reaches a temperature of 220° F., although a small further amount is recovered by heating to 250° F. However, even at 270°–280° F. with distillation of xylene solvent, some methanol remains combined in the sulfonate-lime-oil dispersion, even when 15 to 30% of xylene solvent, based on distillate, has been distilled over. This methanol is only released later on treating the oil with water as shown hereinafter.

A 1000 cc. sample of this stock solution which had been heated to 260° F. to recover methanol, was heated in a still to 280°. Into the hot mixture was passed a current of steam over a period of 10 minutes, during which time 20 gm. steam had been injected while the temperature of the oil fell to 255° F. The distillate consisted of 172 cc. solvent xylene and 18 cc. of aqueous layer containing 36% methanol (0.938 sp. gr. at 80° F.)

The oil was then cooled to 220° F. and treated with 40 cc. water. Twenty grams of hydrated lime was added and thoroughly mixed, the temperature falling to 180° F. providing ample contact with liquid water.

No gelatinization occurred. The oil was dehydrated and stripped of solvent by heating to 350° F., viz:

Minutes: Degree F.
5 _____ 220
13 _____ 300
18 _____ 350

The distillate measured 194 cc. of xylene solvent and 48 cc. aqueous phase containing 9% of methanol by volume.

Half the oil was filtered hot with the aid of 5 gm. Hy-Flo diatomaceous earth, at a good rate, 5 minutes being required. The other half was further treated by emulsifying with 25 cc. water, then dehydrated and filtered rapidly, only 2½ minutes being required. In both cases the oil was clear, but the alkali value was slightly higher in the portion given the additional water treat, viz:

First portion _____ 34 hydroxyl; 300 total.
Second portion _____ 37 hydroxyl; 315 total.

These data show that chemically combined methanol can be removed by steam treatment at elevated temperature, but that liquid water is required to eliminate gel which slows filtration.

The alternative method of processing which I have used successfully employs a controlled amount of water, for example 3 to 20%, but usually about 6 to 10% by volume based on the oil-sulfonate charge. To the above charge, 100 gal. of water are added gradually with thorough agitation after cooling the reaction mixture from the stripping temperature of 220°–270° F. down to about 180° F. so that methanol liberation will not become explosive. After adding water in this manner, mixing is continued for about 1 to 20 minutes, the temperature being about 160 to 200° F. It is important to then dehydrate the oil immediately, typically 1 to 2 hours being sufficient to eliminate all water and methanol at 270° F.

*Example 2*

This test shows the degrading effect of methanol in combination with water. A stock solution of dispersed lime in xylene-oil-sulfonate, fully carbonated as in Example 1, and stripped of free methanol at 260° F. was employed. When treated with water and dehydrated immediately, this stock gave an oil having an alkali value of 33 hydroxyl and 282 total, including both hydroxyl and carbonate alkali values. One portion of the stock solution was stripped with steam at 270° F. to remove combined methanol before the test. Half liter samples of the solutions were shaken thoroughly with water in closed containers and then aged in an oven at 140° F. Results follow:

|  | 2% Water | 6% Water | Steam stripped, then 2% Water |
|---|---|---|---|
| 1½ hours | Clear solution | Emulsion layer | Emulsion layer below clear oil. |
| 3 hours | Cloudy layer | Emulsion thruout | No change. |
| 4½ hours | Murky thruout | Murky | Do. |

All samples were dehydrated to 280° F., then filtered with 5 gm. Hy-Flow.

| Filter Time | 8 minutes | 3 minutes | 40 seconds. |
|---|---|---|---|
| Appearance | Mustard | Mustard | Clear. |

All filtrates were stripped free of solvent at 380° F.

| Appearance, hot | Murky | Murky | Clear. |
|---|---|---|---|
| Appearance, cold | Brown, heavy grease | Translucent, soft grease | Clear oil. |
| Alkali value | 10nphenolphth., 270 methyl orange. | 7 phenolphth., 220 methyl orange. | 10 phenolphth., 250 methyl orange. |

These data show that, where combined methanol is allowed to remain in contact with the product in presence of water, severe degradation takes place as a result of growth of dispersed carbonate particles. The result is observed in increased viscosity, cloudy or murky appearance and slow filtration.

Where the methanol was stripped before the aging test, no degradation occurred. Also, where the amount of water used in the test was small, degradation was greater, owing no doubt to higher methanol concentration.

When injecting water or steam into the hot reaction mixture at 220–270° F., it is necessary to control the rate carefully to avoid explosive evolution of methanol. I prefer to do the mixing and contacting in a continuous mixer in the transfer line leading from the anhydrous methanol stripper to the water treating agitator. I can also pass the hot oil after methanol stripping into a large excess of boiling water, thereby effecting instantaneous evolution of methanol followed by water treating.

*Example 3*

Carbonated stock stripped free of uncombined methanol at 260° F. was treated with water in two stages, viz:

To 400 cc. at 230° F. was added rapidly 20 cc. of water. Foaming occurred and the temperature fell to 198° F., the boiling point of the water-xylene azeotrope.

The mixture was re-heated to 230° and again treated with 20 cc. water. It was then dehydrated and stripped of solvent at 390° F. within 25 minutes of the start. Yield of oil-sulfonate—114 gm. It filtered rapidly with 5 gm. Hy-Flo. Alkali value 7, phenolph., 270, methyl orange. This test was repeated but using three water treats of 5 cc. each with addition of free lime. The dehydrated oil filtered fast at 400° F. and tested 8 (phenolph.) and 300 (methyl orange) alkali value.

*Example 4*

The following scheme describes a suitable procedure for the manufacture of transparent colloidal dispersions of calcium carbonate in lubricating oil suitable for lubrication of internal combustion engines. Into a reaction zone is charged 1.5 to 2.5 volumes of anhydrous methanol and finely powdered calcium oxide maintained in the form of a slurry by agitation. Carbon dioxide is then introduced in an amount sufficient to raise the temperature about 15 to 30° F. by the exothermic heat of reaction. The resulting partially carbonated slurry is then transferred rapidly within a period of about 1 to 10 minutes into 1 volume of a lubricating oil solution of calcium mahogany sulfonate containing about 30 to 40% sulfonate by weight diluted with from ½ to 2 volumes of a volatile hydrocarbon solvent. The carbonation is continued until 75 to 90% of the calcium oxide in the slurry has been carbonated. Additional solvent to provide 3 to 5 volumes total solvent to each volume of sulfonate-oil is added. Anhydrous methanol is distilled off by heat at 220 to 270° F. The mixture is then cooled to about 160 to 220° F. and treated with water in an amount of 0.05 to 0.2 volume per volume of sulfonate-oil charged. After thorough mixing, the liberated methanol, water and part of the solvent are distilled off until the product is substantially free of water. The water treating and dehydrating operation require not less than 5 minutes nor more than 40 minutes. The oil solution in solvent is then filtered to remove unreacted calcium hydroxide and calcium carbonate. The solvent is then stripped from the product giving a transparent dispersion of calcium carbonate in oil and calcium sulfonate.

Having thus described my process, what I claim is:

1. The process of making a transparent, colloidal dispersion of carbonate of Group II metals in lubricating oil for use in lubrication of internal combustion engines which comprises preparing a mixture of an oil soluble sulfonate, a lubricating oil, a volatile hydrocarbon solvent, anhydrous methanol and a methanol complex of a Group II metal, carbonating the reaction mixture by injecting carbon dioxide with rapid agitation until it is substantially no longer absorbed, distilling off the anhydrous free methanol, decomposing remaining methanol complex by steaming at about 220 to 280° F., adding from 3 to 20 percent of water, based on the volume of lubricating oil and sulfonate, while thoroughly agitating the mixture for a period of time of 1 to 20 minutes at a temperature of about 160° to 200° F., then dehydrating the oil by distilling off the free water along with hydrocarbon solvent and liberated methanol.

2. The process of claim 1 wherein the hydrocarbon solvent employed is selected from the class consisting of xylene and petroleum fractions boiling in the range of 250° to 350° F.

3. The process of claim 1 wherein said complex is made in the absence of the sulfonate from anhydrous methanol and calcium oxide by initially mixing to form a slurry, and then carbonating with $CO_2$.

4. The process of claim 3 wherein the sulfonate is diluted with about ½ to 2 volumes of a volatile hydrocarbon solvent before combining with said methanol-calcium oxide slurry and the time of preparing said mixture is within one and ten minutes.

5. The process of claim 3 wherein the carbonated mixture of methanol and calcium oxide is added to the solution of sulfonate and hydrocarbon solvent with rapid agitation.

6. The process of claim 3 wherein the carbon dioxide employed in carbonating oxide in methanol is about 20 to 50% of the total carbon dioxide theoretically required.

7. The process of making a transparent, colloidal dispersion of calcium carbonate in lubricating oil for use in lubrication of internal combustion engines, which comprises charging to a reaction zone 1.5 to 2.5 volumes of anhydrous methanol, dispersing in said methanol, finely powdered calcium oxide while agitatiing the mixture to maintain a slurry, partially carbonating the slurry by introducing carbon dioxide in an amout sufficient to raise the temperature of the slurry about 15 to 30° F. by the exothermic heat of reaction, rapidly introducing into the slurry while agitating, within a period of one to ten minutes, one volume of a lubricating oil solution of calcium mahogany sulfonate containing about 30 to 40% sulfonate by weight, diluted with one-half to two volumes of a volatile hydrocarbon solvent, continuing the carbonation until 75 to 90% of the calcium oxide has been carbonated, adding additional solvent to provide from 3 to 5 volumes of total solvent, distilling off anhydrous methanol by heating to a temperature of 220 to 270° F., decomposing remaining methanol complex by steaming at this temperature, cooling the mixture to a temperature of 160 to 220° F., adding from 0.05 to 0.2 volume of water to the reaction mixture and distilling off liberated methanol, water and solvent until the solution is substantially free of water, the time of water treating and dehydrating being not less than 5 minutes nor more than 40 minutes, filtering the solution to remove undissolved calcium hydroxide and carbonate, and stripping solvent from the resulting transparent dispersion of calcium carbonate in oil and sulfonate.

References Cited by the Examiner

UNITED STATES PATENTS

| | | | |
|---|---|---|---|
| 2,865,956 | 12/1958 | Ellis et al. | 252—33 |
| 2,956,018 | 10/1960 | Carlyle et al. | 252—18 |
| 3,021,280 | 2/1962 | Carlyle | 252—33 |
| 3,155,616 | 11/1964 | Voorhees | 252—18 X |

FOREIGN PATENTS

| | | |
|---|---|---|
| 212,328 | 10/1956 | Australia. |
| 818,323 | 8/1959 | Great Britain. |

DANIEL E. WYMAN, *Primary Examiner.*

E. W. GOLDSTEIN, P. P. GARVIN,
*Assistant Examiners.*